US011180377B2

(12) United States Patent
Dietz et al.

(10) Patent No.: US 11,180,377 B2
(45) Date of Patent: Nov. 23, 2021

(54) METHOD FOR PRODUCING LITHIUM OXIDE

(71) Applicant: ALBEMARLE GERMANY GMBH, Frankfurt am Main (DE)

(72) Inventors: Rainer Dietz, Langen (DE); Johannes Willems, Zurich (CH); Dieter Hauk, Friedberg (DE); Ulrich Wietelmann, Friedrichsdorf (DE)

(73) Assignee: ALBEMARLE GERMANY GmbH, Frankfurt am Main (DE)

( * ) Notice: Subject to any disclaimer, the term of this patent is extended or adjusted under 35 U.S.C. 154(b) by 232 days.

(21) Appl. No.: 16/469,251

(22) PCT Filed: Dec. 18, 2017

(86) PCT No.: PCT/EP2017/083246
§ 371 (c)(1),
(2) Date: Jun. 13, 2019

(87) PCT Pub. No.: WO2018/114760
PCT Pub. Date: Jun. 28, 2018

(65) Prior Publication Data
US 2019/0389734 A1 Dec. 26, 2019

(30) Foreign Application Priority Data

Dec. 21, 2016 (DE) .................... 10 2016 225 882.6

(51) Int. Cl.
| | | |
|---|---|---|
| *C01D 15/00* | (2006.01) | |
| *C01D 15/02* | (2006.01) | |
| *C03C 3/12* | (2006.01) | |
| *C03C 4/14* | (2006.01) | |
| *C03C 10/00* | (2006.01) | |
| *H01M 4/48* | (2010.01) | |
| *H01M 10/052* | (2010.01) | |
| *H01M 4/02* | (2006.01) | |

(52) U.S. Cl.
CPC ............... *C01D 15/02* (2013.01); *C03C 3/12* (2013.01); *C03C 4/14* (2013.01); *C03C 10/00* (2013.01); *H01M 4/483* (2013.01); *H01M 10/052* (2013.01); *C01P 2006/20* (2013.01); *C01P 2006/80* (2013.01); *C03C 2204/00* (2013.01); *H01M 2004/028* (2013.01)

(58) Field of Classification Search
CPC ............. C01D 15/02; C03C 3/12; C03C 4/14; C03C 10/00; H01M 4/483; H01M 10/052
See application file for complete search history.

(56) References Cited

U.S. PATENT DOCUMENTS 4,732,751 A * 3/1988 Salmon .................. C01D 15/02
423/641

FOREIGN PATENT DOCUMENTS

| | | |
|---|---|---|
| CN | 102515211 A | 6/2012 |
| JP | H11-209122 A | 8/1999 |
| JP | H11-209123 A | 8/1999 |
| JP | 2012-121780 A | 6/2012 |
| JP | 2014047117 A | 3/2014 |
| RU | 2604601 C2 | 12/2016 |
| WO | 2012/059143 A1 | 5/2012 |

OTHER PUBLICATIONS

Applegate, D. S., et al., "CRITIC-L-Instrumented Lithium Oxide Irradiation: Part 1-Lithium Oxide Fabrication and Characteristics", Fabrication and Properties of Lithium Ceramics, Advances in Ceramics, vol. 25, ed. I. J. Hastings and G. W. Hollenberg, 1989, 111-116.
Kim, Jong-Wan et al., "Thermal and Carbothermic Decomposition of $Na_2CO_3$ and $Li_2CO_3$", Metallurgical and Materials Transactions B, vol. 32, No. 1, Feb. 2001, pp. 17-24.
Takahashi, T., et al., "Preparation and Characterization of Lithium Oxide", Fusion Eng. and Design 8 (1989) 399-405.
Lidin R.A. et al., Inorganic Chemistry in Reactions, Handbook, 2007 (1), p. 279—with translation. 7 pages total.

* cited by examiner

*Primary Examiner* — Steven J Bos
(74) *Attorney, Agent, or Firm* — Marcy M. Hoefling; Nathan C. Dunn; Troy S. Kleckley

(57) ABSTRACT

A method for the production of lithium oxide and the use of such lithium oxide is described herein. The method includes reacting lithium carbonate with elemental carbon or a carbon source forming elemental carbon under certain reaction conditions. The reaction may be carried out in containers whose product-contacting surfaces are corrosion resistant to the reactants and products. The lithium oxide obtained according to the method described herein can used for the production of pure lithium hydroxide solutions or for the production of glasses glass ceramics or crystalline ceramics, for example, lithium ion conductive ceramics.

26 Claims, No Drawings

METHOD FOR PRODUCING LITHIUM OXIDE

CROSS-REFERENCE TO RELATED APPLICATIONS

This application is a National Stage of International Application No. PCT/EP2017/083246, filed on Dec. 18, 2017, which application claims priority from German Patent Application No. 10 2016 225 882.6, filed Dec. 21, 2016. Each patent application identified above is incorporated here by reference in its entirety.

FIELD

The invention relates to an economical method for the production of powdered lithium oxide and its use.

BACKGROUND

Lithium oxide is currently used as raw material for the Production of glasses, glass-ceramics, ceramics and positive electrodes of lithium batteries. Further, it can be used for the production of lithium hydroxide.

Lithium oxide can be produced by combustion of lithium metal in an atmosphere containing oxygen. This process is uneconomical, as it starts from metallic lithium, which is produced via an energy-consuming fused-salt electrolysis.

$Li_2O$ may further be produced by thermal decomposition of lithium peroxide $Li_2O_2$, at 300-400° C. Also, this process is economically disadvantageous, since it is a two-step process and needs lithium hydroxide and the hazardous oxidizing agent hydrogen peroxide as starting compounds.

Finally, processes are known that start from the Lithium base chemical lithium carbonate. By thermal decomposition at about 1000° C., i.e. of molten lithium carbonate, in platinum crucibles at a pressure of max. 2000 μmHg the oxide in lumpy form arises according to $$Li_2CO_3 \rightarrow Li_2O + CO_2 \quad (1)$$

which must be ground before further use (D. S. Applegate, R. B. Poeppel in: Advances in Ceramics, Vol. 25, "Fabrication and properties of lithium ceramics", ed. I. J. Hastings and G. W. Hollenberg, 1989, 111-116). At a very low pressure of <10-5 Torr, the thermal decomposition can also take place below the melting point of $Li_2CO_3$ of 720° C. (T. Takahashi, H. Watanabe, Fusion Eng. Design 8 (1989) 399-405). However, such low pressures cannot be reached economically in technical apparatuses.

Furthermore, it is known to reduce lithium carbonate in the temperature range 400-725° C. by means of hydrogen gas according to $$Li_2CO_3 + H_2 \rightarrow Li_2O + H_2O + CO \quad (2)$$

(JP2014047117A). This method has safety-related disadvantages, due to the use of explosive hydrogen gas at high temperatures.

Finally, carbon black can be used as a reducing agent for lithium carbonate (J.-W. Kim, H.-G. Lee, Metallurgical Mat. Trans. B, 32B (2001) 17-24). The carbothermic decomposition does not require a vacuum but takes place under an argon gas stream and is rapid at temperatures above about 720° C. according to the following reaction in alumina crucibles:

$$Li_2CO_3 + C \rightarrow Li_2O + 2CO \quad (3)$$

The disadvantage here is the strong corrosion effect of the carbonate melt on the alumina used as container material, as was found out in our own experiments (see Comparative Examples). The crucible mass is removed by formation of $LiAlO_2$. There is no passivation of the crucible wall. Lithium oxide becomes recurrently contaminated by $LiAlO_2$. For this reason, the alumina crucibles cannot be used for the production of high purity lithium oxide. The carbothermal decomposition using coke, charcoal, activated carbon, sugar, synthetic graphite and the like can also take place at temperatures above 500° C., but below 720° C., i.e. while avoiding the melting of lithium carbonate (JP2012121780A). In this case relative long reaction times are to be expected. Similarly, lithium carbonate embedded in a polymer resin can be reduced in the temperature range between 600 and 700° C. to granular lithium oxide (JP11209122A). The disadvantages are the long reaction times of at least 6 hours and the fact that the oxide is obtained in granulated form. For the further use, e.g. for the production of electrode materials for lithium batteries, the product must then be ground up beforehand.

BRIEF NON-LIMITING SUMMARY

It is the object of the invention to provide a simple and single-stage method using the basic raw material lithium carbonate by means of which a powdered lithium oxide can be produced in high purity under economical, simple reaction conditions.

DETAILED DESCRIPTION

According to the invention the object is achieved by a method in which lithium carbonate is reacted with elemental carbon or a carbon source forming elemental carbon under the reaction conditions in the temperature range of 720 to 1200° C., wherein the reaction takes place under substantial exclusion of oxygen and the reaction is carried out in containers whose product-contacting surfaces are corrosion resistant to the reactants and products. The reaction is carried out either under reduced pressure, for example "technical vacuum" (i.e. in the pressure range from 0.1 to 50 mbar) or under gas atmosphere inert or substantially inert to carbon at pressures of about 0.5 to 2 bar. Preferably nitrogen or noble gases (preferably argon) or mixtures of inert gases may be used as inert gas atmosphere.

To obtain a satisfactory reaction rate also from a commercial point of view, the reaction takes place above the melting temperature of lithium carbonate, that is above about 720-730° C. Preferably, the reaction temperature is in the range between 800 and 950° C. Under these conditions, typically, reaction times of less than 5 h, preferably less than 3 h are observed. At 900° C., the reaction time is about 30 minutes according to thermogravimetric analyses. The elemental carbon is used in powdery form. Commercially available carbon black or activated carbon, for example furnace carbon blacks (carbon blacks for car tires) such as Carbon Black N220 and N110, gas carbon blacks like Timcal C45, Conductive Carbon Black or thermal carbon blacks like N990 Thermal Carbon Black are preferably used. These carbons may contain up to 1 wt. % sulfur and up to 2 wt. % silicon. Commercially available, inexpensive carbon blacks produced from petroleum for car tires are also particularly suitable with the following impurity profile: 2300 ppm Na, 1900 ppm S, 200 ppm Ca, 100 ppm Fe, about 1 wt. % Si. It was surprisingly found that the contaminants mentioned can be largely separated in the inventive preparation of aqueous lithium hydroxide solutions by a simple solid/liquid separation method, that is for example, by filtration or centrifugation.

Instead of elemental carbon, an organic, carbon-containing material can be used as a reducing agent. Organic materials coke under the above stated, non-oxidizing (exclusion of oxygen) high temperature conditions completely to elemental carbon and volatile by-products. The elementary carbon, whether used as such or formed under reaction conditions by thermal decomposition of organic materials (coking) is used in the stoichiometric molar ratio of lithium carbonate to carbon of 1:0.5 to 1:1.5.

It has surprisingly been found that the reaction product lithium oxide, although formed from molten lithium carbonate, is obtained as a flowable powder. For further use it is not necessary therefore to transfer the reaction product by crushing or grinding in a manageable form.

To avoid contaminants in the product, as well as from a cost perspective, it is necessary that the reaction is carried out in reaction vessels whose product-contacted surfaces are largely inert against the reactants as well as the reaction products and long-term corrosion resistant. For example, glassy carbon, lithium aluminate or carbon coated ceramics, for example, C@quartz may be used as such resistant construction materials. Furthermore, tantalum has a moderate stability. It was again surprisingly observed that glassy carbon crucibles are corrosion stable against lithium carbonate melt and the lithium oxide formed. This was not to be expected, since it is known that carbon at high temperatures reduces lithium carbonate with lithium oxide formation and thereby is consumed according to Eq. 3. In own experiments it was found that metallic materials are generally unusable. For example, titanium crucibles crumble already after single use. Tantalum, on the other hand, has limited stability.

In the simplest case, the reaction can be carried out under static conditions, i.e. without stirring and without moving. Preferably, the reaction is carried out in a moving bed reactor. For this purpose, the reaction mixture is brought in a rotary tube or in a circulating fluidized bed reactor to the necessary temperature and reacted accordingly to the product lithium oxide. Under homogenizing conditions it is possible to further increase the reaction rate.

It is also possible to liquefy the mixture of carbon and lithium carbonate in an externally cooled reaction space by inductive heating and thus to react the two reactants. Due to the external cooling a layer of frozen melt forms so that the molten reaction mixture, which is continuously pumped or pushed through the reaction vessel, does not come into contact with the container material (for example, copper). This procedure is known by the term "skull technique".

The lithium oxide-containing reaction mixture according to the invention can be used, for example, for the production of pure lithium hydroxide solution by dissolving the reaction product in Water. The amount of water should be chosen so that the reaction product lithium hydroxide (LiOH) has a concentration of at least 8 wt. %. Preferably, the LiOH concentration is at least 9 wt. %. Any excess carbon is insoluble in water, so it can be easily removed by filtration or centrifugation. It was surprisingly observed that more contaminants such as the silicon introduced via the carbon source or sulfur, are converted into water-insoluble products, so that these also can be separated by a simple solid/liquid separation method. In this way a pure lithium hydroxide solution is obtained from which pure, solid lithium hydroxide or lithium hydroxide monohydrate can be produced by a known method. The purity of the 10% solution of LiOH produced by the method according to the invention is preferably at least 99.8%. The concentrations of the contaminants silicon and sulfur which were introduced mainly via the carbon source are preferably not more than 0.05 and 0.1 wt. %, respectively, based on LiOH contained. The contaminants can be further depleted in the subsequent crystallization of LiOH×H$_2$O. The lithium oxide according to the invention can be used for the production of cathode materials (positive electrode materials) for lithium batteries and for the production of glasses, glass ceramics or crystalline ceramics. Very particularly preferred is the use for lithium-conductive glasses, glass ceramics or ceramics. Such materials, for example LLZO (lithium lanthanum zirconium oxide with garnet structure), have a lithium conductivity of at least $10^{-5}$ S/cm at room temperature (RT).

EXAMPLES

Example 1: Production of Lithium Oxide by Carbothermal Decomposition of Lithium Carbonate in Glassy Carbon Crucible 8.6 g of Li$_2$CO$_3$ (116 mmol) together with 1.4 g of C (Carbon Black N220, 116 mmol C) were filled into a bottle with ISO thread, mixed on the dolly and filled into a crucible made of glassy carbon, the bed height was 0.75 cm.

The crucible was flushed in a quartz glass tube continuously with 50 l of N$_2$/h and heated to 900° C. in a tube furnace. After 4 hours, cooling was started.

The product obtained was: 3.4 g (100% of theory) of weakly gray powder. The total base (acidimetric titration) gave the following result: 66.1 mmol OH$^-$/g, corresponding to 98.8% Li$_2$O. The following contaminants were determined by means of ICP (Inductively Coupled Plasma): 0.50 wt. % Si; 0.35 wt. % S; 0.03 wt. % Na; 0.03 wt. % Ca; 0.005 wt. % Al Total Organic Carbon (TOC): 0.1 wt. % C and XRD: only reflections for Li$_2$O.

Particle size distribution (measurement with Mastersizer 3000 from Malvern Instruments):

$D_{10}$=30 µm $D_{50}$=69 µm $D_{90}$=163 µm

No measurable mass change of the crucible was observed, the weight difference was <0.01 g. The same crucible was used for a further 10 experiments without any microstructural destruction or weight change being observed.

Example 2: Production of a Pure Aqueous Lithium Hydroxide Solution from Lithium Oxide 2.1 g of the product from Example 1 were dissolved in 31.0 g of water and insoluble residue was filtered off. The clear, colorless filtrate was analyzed:

Total base (acidimetric titration). 4.25 mmol/g corresponding to 10.2 wt. % LiOH (97% of theory)

Carbonate titration: 0.15 wt. % Li$_2$CO$_3$.

The following contaminants were found by ICP analysis of the solution:

8 ppm Fe; Na, K<10 ppm; 60 ppm S; 14 ppm Si

The purity of the lithium hydroxide formed is about 99.9% (based on LiOH-solid contained).

Extrapolated to the lithium oxide used, the main contaminants were thus depleted as follows:
Si: 96%
S: 73%

Comparative Example 1: Production of Lithium Oxide by Carbothermal Decomposition of Lithium Carbonate in the Alox Crucible As in Example 1, a mixture of 8.6 g of lithium carbonate powder and 1.6 g of carbon black, type N220 was reacted at 900° C. to form lithium oxide in a crucible made of $Al_2O_3$.

The reaction product contained 0.34 wt. % Al. In comparison, the product produced in the glassy carbon crucible only 0.005 wt. % Al. 0.05 wt. % crucible mass was removed by corrosion. In subsequent experiments similar removal rates were observed. Thus, there is no passivation of the surface.

Comparative Example 2: Production of Lithium Oxide by Carbothermal Decomposition of Lithium Carbonate in the Ti-Lined Crucible A titanium foil was placed at the bottom of glassy carbon crucible and a homogenized reaction mixture consisting of 8.6 g of lithium carbonate and 1.6 g of carbon black, type N220, was added on top. The reaction mixture was reacted to form lithium oxide under the same conditions as described in Example 1.

The foil became white and brittle during the course of the reaction. It already disintegrated at slight mechanical stress and could not be completely separated from the $Li_2O$ formed.

What is claimed is:

1. A method for the production of powdered lithium oxide from lithium carbonate and elemental carbon or a carbon source forming elemental carbon under reaction conditions comprising a temperature in the range of 720° C. to 1200° C., characterized in that a reaction takes place under substantial exclusion of oxygen and the reaction is carried out in one or more containers having product-contacting surfaces selected from the group consisting of glassy carbon, lithium aluminate, carbon-coated ceramic, C-coated quartz glass, and tantalum.

2. The method according to claim 1, characterized in that the elemental carbon is reacted with the lithium carbonate in the stoichiometric ratio of lithium carbonate to carbon of 1:0.5 to 1:1.5.

3. The method according to claim 1, characterized in that the elemental carbon is used in the form of carbon black or activated carbon having a sulfur content of up to 1 wt. % and a silicon content up to 2 wt. %.

4. The method according to claim 1, characterized in that the source of elemental carbon are organic materials or organic material mixtures selected from the group consisting of sugar, methane, starch, cellulose, paraffin wax, and petroleum.

5. The method according to claim 1, characterized in that the temperature is in the range between 800° C. and 950° C.

6. The method according to claim 1, characterized in that the reaction is carried out under inert gas atmosphere at a pressure in the range of about 0.01 bar to about 2 bar, wherein the inert gas atmosphere is selected from the group consisting of nitrogen, noble gases, and any mixture of two or more of the foregoing.

7. The method according to claim 1, characterized in that the reaction is carried out in a moving bed reactor.

8. The method according to claim 1, characterized in that the reaction is carried out in a moving bed reactor selected from the group consisting of a rotary reactor and a circulating fluidized bed reactor.

9. The method according to claim 1 characterized in that the powdered lithium oxide is dissolved in water to produce lithium hydroxide solution, the lithium oxide in water, the amount of water being chosen so that the lithium hydroxide (LiOH) has a concentration of at least 8 wt. % and that the insoluble constituents are removed by filtration or centrifugation.

10. The method according to claim 1 characterized in that the powdered lithium oxide is obtained as a flowable powder, without prior modification of the lithium oxide by crushing or grinding.

11. The method according to claim 1, characterized in that the reaction takes place under vacuum conditions at a pressure in the range of 0.1 mbar to 50 mbar.

12. The method according to claim 1, characterized in that the powdered lithium oxide is flowable and has a carbon content of about 0.1 wt. %, measured as elemental carbon.

13. The method according to claim 1, characterized in that the product-containing surfaces of the one or more containers represent a different component than the elemental carbon or the carbon source forming elemental carbon.

14. A method for the production of powdered lithium oxide from lithium carbonate and elemental carbon or a carbon source forming elemental carbon under reaction conditions comprising a temperature in the range of 720° C. to 1200° C., characterized in that a reaction takes place under substantial exclusion of oxygen and the reaction is carried out in a moving bed reactor.

15. The method according to claim 14, characterized in that the elemental carbon is reacted with the lithium carbonate in the stoichiometric ratio of lithium carbonate to carbon of 1:0.5 to 1:1.5.

16. The method according to claim 14, characterized in that the elemental carbon is used in the form of carbon black or activated carbon having a sulfur content of up to 1 wt. % and a silicon content up to 2 wt. %.

17. The method according to claim 14, characterized in that the source of elemental carbon are organic materials or organic material mixtures selected from the group consisting of sugar, methane, starch, cellulose, paraffin wax, and petroleum.

18. The method according to claim 14, characterized in that the temperature is in the range between 800° C. and 950° C.

19. The method according to claim 14, characterized in that the reaction is carried out under inert gas atmosphere at a pressure in the range of about 0.01 bar to about 2 bar, wherein the inert gas atmosphere is selected from the group consisting of nitrogen, noble gases, and any mixture of two or more of the foregoing.

20. The method according to claim 14, characterized in that the reaction is carried out in a moving bed reactor selected from the group consisting of a rotary reactor and a circulating fluidized bed reactor.

21. The method according to claim 14 characterized in that the powdered lithium oxide is dissolved in water to produce lithium hydroxide solution, the amount of water being chosen so that the lithium hydroxide (LiOH) has a concentration of at least 8 wt. % and that the insoluble constituents are removed by filtration or centrifugation.

22. The method according to claim 14 characterized in that the powdered lithium oxide is obtained as a flowable powder, without prior modification of the lithium oxide by crushing or grinding.

23. The method according to claim 14, characterized in that the reaction takes place under vacuum conditions at a pressure in the range of 0.1 mbar to 50 mbar.

24. The method according to claim 14, characterized in that the powdered lithium oxide is flowable and has a carbon content of about 0.1 wt. %, measured as elemental carbon.

25. The method according to claim 14, characterized in that the moving bed reactor has product-contacting surfaces that are corrosion resistant to the reactants and products.

26. The method according to claim 25, characterized in that the product-contacting surfaces are selected from the group consisting of glassy carbon, lithium aluminate, carbon-coated ceramic, C-coated quartz glass, and tantalum.

* * * * *

UNITED STATES PATENT AND TRADEMARK OFFICE
CERTIFICATE OF CORRECTION

PATENT NO.        : 11,180,377 B2
APPLICATION NO.   : 16/469251
DATED             : November 23, 2021
INVENTOR(S)       : Dietz et al.

Page 1 of 1

It is certified that error appears in the above-identified patent and that said Letters Patent is hereby corrected as shown below:

In the Claims

At Column 6, Line 7, Claim 9 please delete "the lithium oxide in water,".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*